April 12, 1949.  P. J. J. TERCE  2,467,059
DEVICE FOR OBTAINING STEREOSCOPIC IMAGES
IN CINEMATOGRAPHIC PROJECTIONS
Filed April 17, 1947
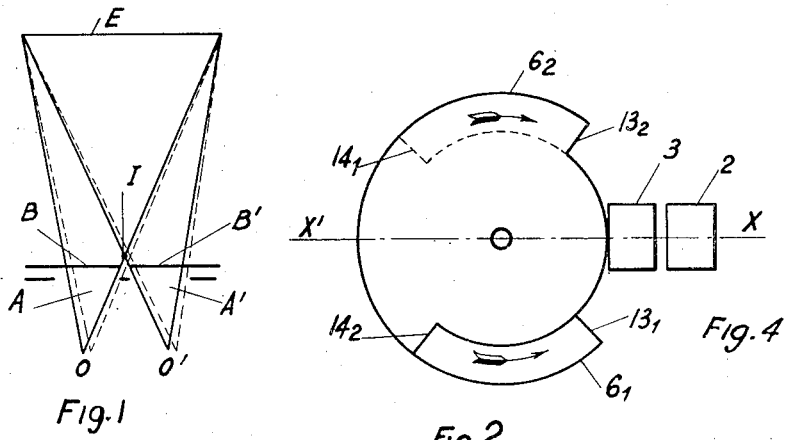
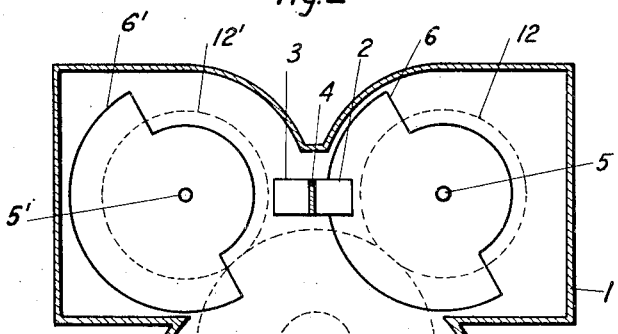
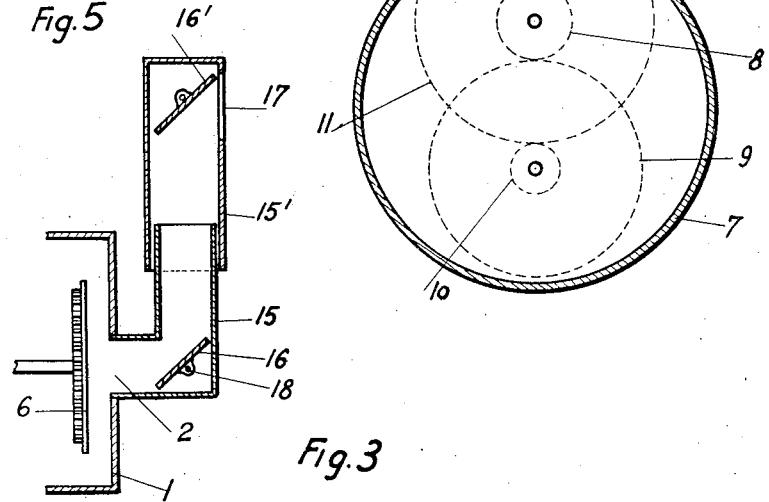
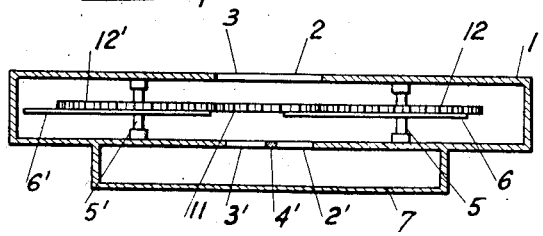
Inventor
Paul Joseph Jean Terce
By Robert E. Burns
Attorney Patented Apr. 12, 1949

2,467,059

UNITED STATES PATENT OFFICE 2,467,059

DEVICE FOR OBTAINING A STEREOSCOPIC IMAGE IN CINEMATOGRAPHIC PROJECTION

Paul Joseph Jean Tercé, Paris, France

Application April 17, 1947, Serial No. 742,074
In France April 19, 1946

5 Claims. (Cl. 88—16.6)

The present invention relates to a device for obtaining a stereoscopic image in cinematographic projection by projecting alternately on a screen two series of stereoscopic images, one series on the right and the other on the left, and by an alternate occultation of the screen for each eye of the spectator during the projection of the image corresponding to the other eye. Devices of this kind are already known, occultation in the said devices taking place in an individual instrument of observation provided with two shutters which are synchronized with the projection. In the said known devices the individual instrument of observation is embodied either by telescopes which are always inconvenient, usually heavy and cumbersome, and which do not permit spectators to use their individual correcting glasses, or by lorgnettes which one must hold before the eyes always nearly at the same place which leads also to much inconvenience or again by observation devices in a fixed or semi-fixed position and which for being used correctly compel the spectator to keep his head close against the observation device which also leads to a great fatigue and lack of comfort. The purpose of the device which is the object of the present invention is to obviate these inconveniences, the said device being characterized by the fact that the instrument of observation is arranged, between the spectator's eyes at a certain distance from them, say 10 cm., and the intersection of two optical cones whose vertices coincide with the eyes and their bases with the screen. It is further characterized by the fact that it is provided with a sufficiently large opening so that the two visual cones are not cut by the edges of the opening for displacements of the spectator's head over a few centimeters either sideways or lengthwise, two shutters rotating without phase shifting and in synchronism with the projection apparatus and shutting alternately the two halves of the said opening.

Owing to this arrangement one obtains an observation instrument with a broad field of view while the use of two shutters, each shutting one half of the opening, insures on one hand a correct vision even when the observer's head is not at the center, and on the other hand gives alternations of shutting and seeing which are independent from the position of the eyes at the back of the instrument as long as the optical cones, or one of them, are not infringed upon by the edges of the opening. This, on the contrary, is not taking place in certain similar instruments but which are provided with one shutter only and accordingly the above arrangement permits with respect to the latter instruments to increase considerably the period of the free and selected vision for each eye. It is known as a matter of fact that in devices of this kind the projection must be interrupted during the time intervals for which the two halves of the observation opening (or the two separate observation windows) are both partially opened.

By way of example an embodiment of the invention is described below and shown on the drawing herewith attached.

Fig. 1 gives a diagram on the principle of the said embodiment.

Figs. 2 and 3 show respectively a transverse vertical section and horizontal section of the observation instrument according to the invention.

Fig. 4 shows an alternative of the shutter used on Figs. 2 and 3.

Fig. 5 shows a sectional elevation of an observation instrument provided with a periscopic device.

As shown diagrammatically on Fig. 1 in which E denotes the screen upon which are projected two series of stereoscopic alternate images, on the right and on the left, the observation instrument according to the invention is provided with two adjacent windows A, A' (or with one window only, the partition between them being removed). In front of the said windows two shutters B, B', are rotating in synchronism with the apparatus of projection and alternately uncover windows A, and A'. These windows are provided at a distance of the order of 10 cm. from the spectator's eyes O, O', between his eyes and the intersection curve I of the two optical cones whose vertices coincide with the eyes their bases coinciding with the screen E. Furthermore the size of the window/or windows A, A' is sufficient for allowing the spectator, as shown in dotted lines, to move his head sideways by a few centimeters with respect to his average position without both optical cones being partially infringed upon by the edges of the window, so that notwithstanding a certain freedom for moving sideways and lengthwise the spectator will keep seeing the whole of the two series of images projected on screen E.

As shown on Figs. 2 and 3, the observation instrument consists of a flat-shaped case 1, the two larger faces of which are provided with two windows 2—3, 2'—3' arranged in juxtaposition corresponding respectively to the field of vision of both eyes, the windows for each pair being separated, if required, by a vertical stud of small width. These windows may be fitted or not with panes. Inside the case two disk shutters 6, 6', fitted on axles 5, 5' are each carrying on the half of their periphery a sector-shaped cut which allows the corresponding window to uncover for half a turn. These two disks 6, 6' are synchronized with the projection apparatus, both rotating in the same direction and their respective cuts being in phase.

In the course of their operation the two shutters uncover in succession each window completely and then partially and shut it entirely. During the intermediate short period for which the two windows are uncovered partially and in a complementary manner, the projection of images is interrupted on the two projection apparatuses. This projection is resumed for the window which uncovers when it is entirely uncovered and it stops when that window begins to shut down. In this way each image is seen by the spectator during a little longer than the $\frac{1}{10}$ of the period for one turn of the shutter.

The disks are driven by a separate motor for each casing of the observation instrument, this motor being preferably fitted under the casing into a housing such as 7 and driving axles 5, 5' of disks 6, 6' by means of a reduction gear 8, 9, 10, 11, 12, 12', or in the case of moving-picture house the disks may be driven by one motor which is common to a whole row of spectators and which operates the shutters by means of a flexible cable such as a Bowden cable. The cases of the observation instruments for each row may be easily fitted on the back of the seats of the preceding row for instance by means of an articulated orientable support.

For important improvement of the device described above consists, as shown in Fig. 4, to fit two concentric disks $6_1$, $6_2$, instead of each disk 6, 6', the said disks $6_1$, $6_2$, turning in opposite directions, the edges $13_1$, $13_2$, and $14_1$, $14_2$ of their sector-shaped cuts coinciding as they pass over the horizontal axis of symmetry XX' of window 2, 3. Owing to this arrangement it is possible to reduce the breadth and height of the casing nearly by half.

The observation instrument described above may be further completed by a periscopic device which enables a spectator of any size to adjust the observation instrument at a height corresponding to a field of free vision (for instance the vision for which his seeing is not disturbed by the spectators of the row which is in front of him or by any other obstacle). For instance, as shown in Fig. 5, on each of windows 2, 3 of the front face of case 1 a telescopic tube 15, 15' is fitted, the fixed lower end 15 of said tube being provided with a mirror 16, inclined approximately at 45°, whose part 15', adjustable heightwise, is provided on the top with a second mirror 16' parallel to the first mirror and arranged in front of an opening 17 which is facing the screen. When the support of the observation instrument is adjustable heightwise one of the mirrors 16, 16', for instance the position of mirror 16, is such that it may be oriented about its axis 18.

What I claim is:

1. In a device for obtaining motion pictures with stereoscopic effect by projecting alternately upon a screen two series of stereoscopic images, right and left, wherein each spectator is provided with an individual viewing instrument comprising in combination a wide viewing opening arranged at a certain distance, of the order of 10 cm., from the spectator's eyes, between the spectator's eyes and the intersection of the optical cones whose vertices are coinciding with the eyes, said opening being sufficiently wide so that the said optical cones are not infringed upon by the edges of the opening for sidewise or lengthwise displacements of the spectator's head by a few centimeters, with two shutters rotating in synchronism and without phase shift with respect to the projection apparatus and shutting alternately the two halves of the said opening.

2. Device according to 1 in which the two shutters consist of two disks fitted on two parallel axles arranges on either side of the opening and rotating in the same direction, each disk being provided on its periphery with a sector-shaped cut extending over 180°, the two disks being keyed one with respect to the other so that the edges of the cuts with which they are provided are simultaneously passing by the horizontal axis of symmetry of the opening of the observation instrument.

3. Device according to 1 in which each shutter consists of two juxtaposed disks with means to rotate the said disks in reverse direction one with respect to the other, each disk being provided on its periphery with a sector like cut extending over 180° and the two justaposed disks being keyed so that the two cuts are opposing when their edges are passing by the horizontal axis of symmetry of the opening.

4. Device according to 1 in which the opening of the observation instrument is provided with a thin separating stud arranged along the vertical axis of symmetry of the said opening which is divided by the said stud in two adjacent windows.

5. Device according to 1 in which the individual observation instrument comprises a case provided on its two faces with two adjacent windows, two shutters arranged into the said case for the alternate occulation of the two windows, the said shutters consisting of two disks fitted on two parallel axles arranged on either side of the opening and rotating in the same direction, each disk being provided on its periphery with a sector-shaped cut extending over 180°, the two disks being keyed one with respect to the other so that the edges of the cut with which they are provided are simultaneously passing by the horizontal axis of symmetry of the opening of the observation instrument, an electric motor and intermediate gearing arranged in the said case for driving the two shutters.

PAUL JOSEPH JEAN TERCÉ.

REFERENCES CITED

The following references are of record in the file of this patent:

UNITED STATES PATENTS

| Number | Name | Date |
|---|---|---|
| 521,854 | Freese et al. | June 26, 1894 |
| 1,260,285 | Cordel | Mar. 19, 1918 |
| 1,300,901 | Warner | Apr. 15, 1919 |
| 1,396,651 | Moore | Nov. 8, 1921 |
| 1,506,524 | Hammond | Aug. 26, 1924 |
| 2,255,197 | Thomas | Sept. 9, 1941 |
| 2,273,512 | Caldwell et al. | Feb. 17, 1942 |
| 2,362,030 | Seemann | Nov. 7, 1944 |

FOREIGN PATENTS

| Number | Country | Date |
|---|---|---|
| 470,821 | Germany | Jan. 28, 1929 |